United States Patent
Sohail et al.

(10) Patent No.: US 11,934,445 B2
(45) Date of Patent: Mar. 19, 2024

(54) AUTOMATIC MEMORY CONTENT ITEM PROVISIONING

(71) Applicant: Meta Platforms Technologies, LLC, Menlo Park, CA (US)

(72) Inventors: Maheen Sohail, San Francisco, CA (US); Hyunbin Park, Palo Alto, CA (US); Xinyue Zhang, Mountain View, CA (US); Tali Zvi, San Carlos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 241 days.

(21) Appl. No.: 17/174,293

(22) Filed: Feb. 11, 2021

(65) Prior Publication Data
US 2022/0207073 A1    Jun. 30, 2022

Related U.S. Application Data

(60) Provisional application No. 63/131,274, filed on Dec. 28, 2020.

(51) Int. Cl.
*G10L 15/00*    (2013.01)
*G06F 16/438*    (2019.01)
(Continued)

(52) U.S. Cl.
CPC .......... *G06F 16/4393* (2019.01); *G06N 3/08* (2013.01); *G06Q 50/01* (2013.01); *G10L 15/22* (2013.01);
(Continued)

(58) Field of Classification Search
None
See application file for complete search history.

(56) References Cited

U.S. PATENT DOCUMENTS

| | | |
|---|---|---|
| 7,869,658 B2 | 1/2011 | Blose et al. |
| 10,324,973 B2 | 6/2019 | Circlaeys et al. |

(Continued)

FOREIGN PATENT DOCUMENTS

EP    1681640 A2    7/2006

OTHER PUBLICATIONS

Lee L.S., et al., "Spoken Content Retrieval-Beyond Cascading Speech Recognition with Text Retrieval," IEEE/ACM Transactions on Audio, Speech, and Language Processing, Sep. 2015, vol. 23, No. 9, pp. 1389-1420, DOI: 10.1109/TASLP.2015.2438543.

(Continued)

*Primary Examiner* — Tuankhanh D Phan
(74) *Attorney, Agent, or Firm* — Potomac Law Group, PLLC; Dannon G. Allbee

(57) ABSTRACT

An automatic memory system can automatically identify and present content items that match a user's natural language (NL) input. The automatic memory system can compute a match score between the NL input and each of multiple potential memory content items. The automatic memory system can compute the match score using a variety of algorithms and/or machine learning models such as an image/NL matching process to get a first match score, a tag matching process to get a second match score, and/or a combination match score from the first and second match scores. The automatic memory system can select one or more of the content items with the highest match score(s). The automatic memory system can provide the selected content items, such as by suggesting them to the NL providing user, automatically displaying or playing them, inserting them into the conversation thread, etc.

20 Claims, 8 Drawing Sheets

(51) Int. Cl.
*G06N 3/08* (2023.01)
*G06Q 50/00* (2012.01)
*G10L 15/22* (2006.01)
*G10L 15/26* (2006.01)

(52) U.S. Cl.
CPC ........ *G10L 15/26* (2013.01); *G10L 2015/223* (2013.01)

(56) References Cited

U.S. PATENT DOCUMENTS

| | | |
|---|---|---|
| 11,397,759 B1 | 7/2022 | Park et al. |
| 2003/0144055 A1 | 7/2003 | Guo et al. |
| 2005/0027712 A1 | 2/2005 | Gargi et al. |
| 2005/0097120 A1 | 5/2005 | Cooper et al. |
| 2006/0153460 A1 | 7/2006 | Kim et al. |
| 2012/0221567 A1 | 8/2012 | Finkelstein et al. |
| 2012/0265819 A1 | 10/2012 | McGann et al. |
| 2012/0290950 A1 | 11/2012 | Rapaport et al. |
| 2014/0161356 A1 | 6/2014 | Tesch et al. |
| 2015/0382047 A1 | 12/2015 | Van Os et al. |
| 2016/0026919 A1 | 1/2016 | Kaisser et al. |
| 2016/0117347 A1 | 4/2016 | Nielsen et al. |
| 2016/0357872 A1 | 12/2016 | Fader et al. |
| 2016/0371276 A1 | 12/2016 | Furtado et al. |
| 2017/0169101 A1 | 6/2017 | Walia et al. |
| 2017/0242886 A1 | 8/2017 | Jolley et al. |
| 2017/0293610 A1 | 10/2017 | Tran |
| 2018/0018372 A1 | 1/2018 | Franke |
| 2018/0024989 A1 | 1/2018 | Bharti et al. |
| 2018/0136615 A1 | 5/2018 | Kim et al. |
| 2018/0173698 A1* | 6/2018 | Dubey ................ G06F 16/3347 |
| 2019/0042988 A1 | 2/2019 | Brown et al. |
| 2019/0087500 A1 | 3/2019 | Danyluk et al. |
| 2019/0108286 A1 | 4/2019 | Pan et al. |
| 2019/0189019 A1 | 6/2019 | Hammersley et al. |
| 2019/0251716 A1 | 8/2019 | Nelson |
| 2020/0117858 A1 | 4/2020 | Freeman et al. |
| 2020/0125575 A1 | 4/2020 | Ghoshal et al. |
| 2020/0233863 A1 | 7/2020 | King |
| 2020/0233893 A1 | 7/2020 | He et al. |
| 2020/0357382 A1 | 11/2020 | Ogawa et al. |
| 2020/0372075 A1* | 11/2020 | Rogynskyy ............. H04L 51/48 |
| 2021/0136205 A1 | 5/2021 | Adibi et al. |
| 2021/0150541 A1 | 5/2021 | Gurbuxani et al. |
| 2021/0158071 A1 | 5/2021 | Yoshida et al. |
| 2021/0203784 A1 | 7/2021 | Konig et al. |
| 2021/0256452 A1 | 8/2021 | Lavigne et al. |
| 2021/0405908 A1 | 12/2021 | Bassett |
| 2022/0179665 A1 | 6/2022 | Rathod |
| 2022/0199079 A1 | 6/2022 | Hanson et al. |

OTHER PUBLICATIONS

Bhargava A., et al., "Easy Contextual Intent Prediction and Slot Detection," IEEE International Conference on Acoustics, Speech and Signal Processing, 2013, pp. 8337-8341, DOI: 10.11 09/ICASSP. 2013.6639291.

International Search Report and Written Opinion for International Application No. PCT/US2021/063400, dated Mar. 9, 2022, 10 pages.

International Search Report and Written Opinion for International Application No. PCT/US2022/023261, dated Jul. 15, 2022, 8 pages.

International Preliminary Report on Patentability for International Application No. PCT/US2021/063400, dated Jul. 13, 2023, 9 pages.

Wang Y.C., et al., "Can You be More Social? Injecting Politeness and Positivity into Task-Oriented Conversational Agents," arXiv: 2012.14653v1, Dec. 29, 2020, 13 pages.

* cited by examiner

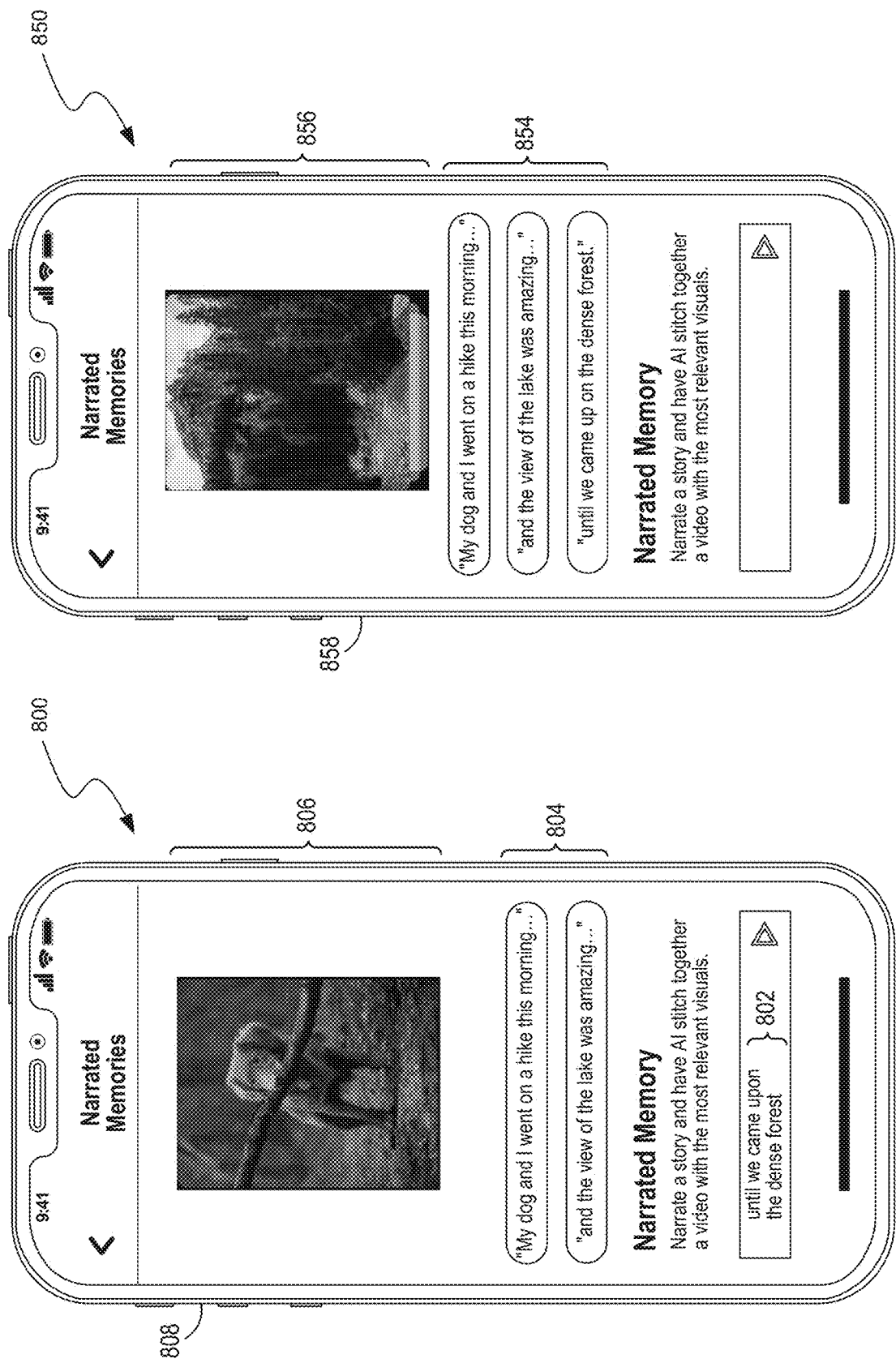

AUTOMATIC MEMORY CONTENT ITEM PROVISIONING

CROSS REFERENCE TO RELATED APPLICATIONS

This application claims the benefit of U.S. Provisional Application No. 63/131,274, filed Dec. 28, 2020 which is incorporated herein by reference in its entirety.

TECHNICAL FIELD

The present disclosure is directed to automatic selection of content items matching a natural language input.

BACKGROUND

With the ubiquity of mobile and other recording devices that can capture moments of people's lives, an overwhelming amount of "memory content items" such as photos, audio, and video have become available. The amount of such memory content items is further expanded through the sharing of such memory content items, giving people access to not only memory content items they captured but also those of their friends, acquaintances, and publicly shared content items. People can spend hours simply organizing or searching through their vast collections of memory content items, which can be troublesome, for example, when a content item is needed on a moment's notice, such as when a person is having a conversation and would like to show the content item.

BRIEF DESCRIPTION OF THE DRAWINGS

FIGS. 8A and 8B are conceptual diagrams illustrating an example of automatic memory content item presentation based on a textual conversation.

The techniques introduced here may be better understood by referring to the following Detailed Description in conjunction with the accompanying drawings, in which like reference numerals indicate identical or functionally similar elements.

DETAILED DESCRIPTION

Figure 1:
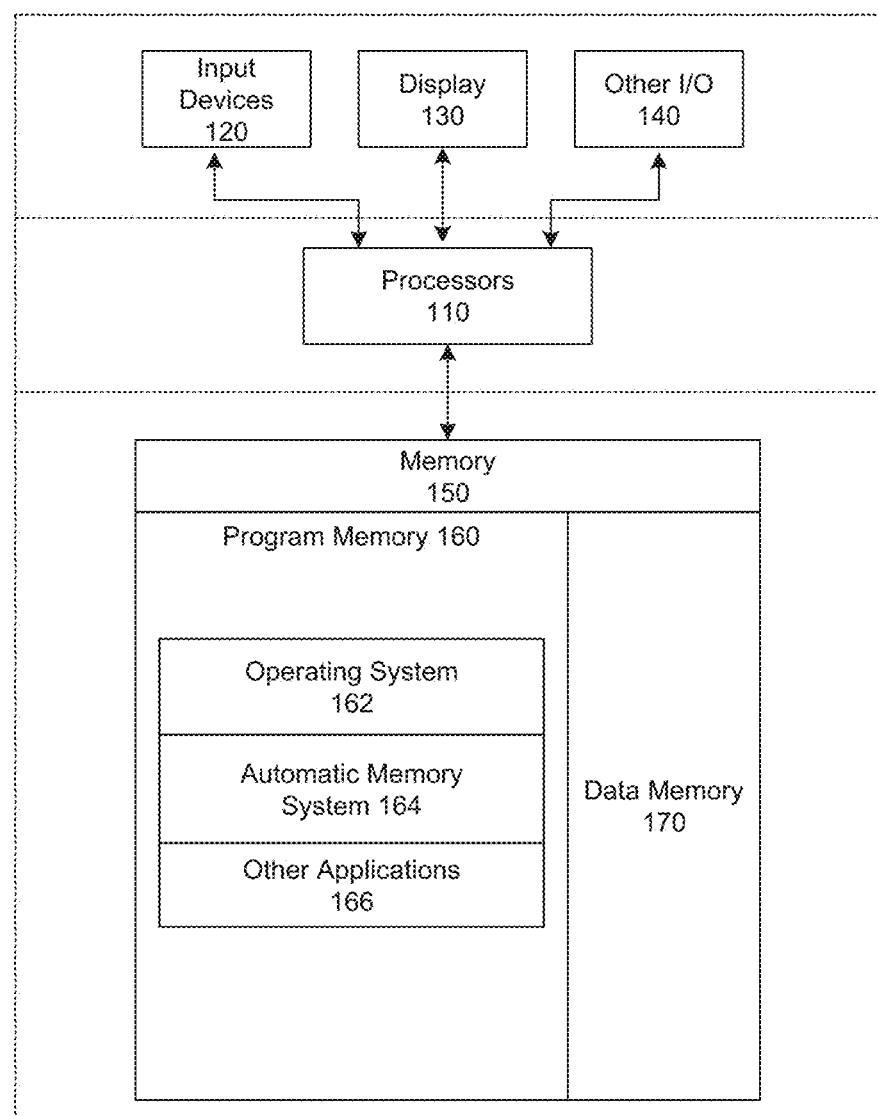
FIG. 1 is a block diagram illustrating an overview of devices on which some implementations can operate.

Users can find it difficult to locate a particular picture, video, or other memory content item, even though they remember having it. Users can find this especially challenging when the user would like to present that content item as part of an ongoing conversation but cannot locate it or the user does not want to pause the conversation while she finds it. For example, a user may be sitting with a friend and want to tell the friend about a moment from her recent trip she captured in a picture, but instead the conversation is derailed for five minutes while the user scans through her photo album. An automatic memory system can alleviate this concern by automatically identifying and presenting content items that match a user's natural language (NL) input.

The automatic memory system can obtain the NL input from a user e.g., from part of a thread from a textual conversation or recorded audio of the user speaking, which may be converted to text. The automatic memory system can also obtain one or more content items that may match the NL input. In various implementations, the content items can be obtained from various sources such as content items posted to social media by the NL input provider, one or more other participants in the thread, a user with a particular level of connection, on a social media source, with the NL input provider or with the one or more other thread participants, etc. As further examples, the content items can be obtained based on a category or keyword for the content items matching a category or keyword determined for the NL input. Yet further, the content items can be from a user-selected or default source, such as personal repositories (e.g., a local folder or album of the user, a designated cloud storage provider or area thereon, etc.) or public sources (e.g., public social media posts, news reports, cloud image or video services, streaming services, etc.)

The automatic memory system can compute a match score between the NL input and each of the content items. The automatic memory system can select one or more of the one or more content items with the highest match score(s), which can be qualified by criteria such as a minimum threshold match score or that the highest match score(s) for the selected content items must be a threshold amount above other match scores. The automatic memory system can provide the content items, such as by suggesting them to the NL providing user, automatically displaying or playing them, inserting them into the conversation thread, etc.

The automatic memory system can compute the match score using a variety of algorithms and/or machine learning models. In some implementations the automatic memory system can use an image/NL matching process to get a first match score. In other implementations, the automatic memory system can use a tag matching process to get a second match score. Either of these match scores can be used alone, or in yet further implementations, the automatic memory system can compute a combination match score from the first and second match scores. As an example, the automatic memory system may use an image/NL matching process that applies a machine learning model trained to produce a first match score when it receives both a segment of NL and an image or other content item. In this example, the automatic memory system can also use a tag matching process that determines a second match score by comparing key elements of the NL input with tags (e.g., depicted objects, people, events, or associated times) for the content items. The automatic memory system can then combine the first and second match scores, e.g., by adding or averaging them. In some implementations, the first and second match scores can be weighted, e.g., based on confidence values for each process, determined based on a historical accuracy determined for each process. Additional details on selecting content items by computing match scores for content items to NL input are discussed below in relation to FIG. 4.

The automatic memory system can perform the image/NL matching process by first segmenting the NL input paragraph into sections (e.g., sentences, independent clauses, etc.) using existing NLP models. The automatic memory system can then apply a trained model (such as the existing ViLBERT model—see https://arxiv.org/abs/1908.02265) that takes as input a pair comprising an NL model segment and a content item and generates a partial match score. In some implementations, the model can take, in addition to the NL segment, image content, audio content, video content, or a combination thereof. The partial match scores that all correspond to the same content item can be combined (e.g., by averaging) to get a first match score for that content item to the NL input. Additional details on computing a first match score by applying a model to input that includes an NL segment and a content item are discussed below in relation to FIG. 5.

The automatic memory system can perform the tag matching process by employing three processes: one to identify key elements in the NL input, a second to obtain tags for content items, and a third to perform matching between the key elements and the tags for particular content items. In various cases, these processes can use machine learning models and/or heuristics.

In the first process, the automatic memory system can extract key elements from the NL input, such as people, places, objects, activities, times/dates, and keywords. A machine learning model can be trained to identify these key elements e.g., by applying existing parts-of-speech taggers or NLP semantic models. Further input priors for the models or alternate heuristics that can be applied to identify key elements include obtaining relationships between the NL input provider and other entities on a social graph (e.g., who the user is friends with, what activities the user engages in, where the user has checked in, etc.), through geo-location matching (e.g., where the user has been), sharing activity (e.g., who the user has interacted with, what type of content the user is most likely to share), etc. These identifications can be used to determine which people, places, things, dates/times, or acts described in the conversation have stronger associations with the speaker's propensity to share certain content items.

In the second process, the automatic memory system can identify tags for content items, e.g., by applying existing object, place, or person recognition models (e.g., trained using human tagged items, social media hash tags on content items, messages or posts provided in conjunction with content items, check-ins with photos to locations, street mapping data, audio-to-text models, etc.) User provided tags on content items (such as the title, a hashtag when the content item was posted, comments by the content item poster or from others on a social media platform, etc.) or meta-data on content items (such as date captured, size, location, etc.) can also or alternatively be used as content item tags.

In some implementations for the third process, the automatic memory system can use a model that embeds the language of the key elements and the language of the memory tags into a shared n-dimensional space. The automatic memory system can then determine, for each particular content item, a combination of the distances (e.g., cosine distances) between the embeddings of the key elements from the NL input and the embeddings of the tags for that particular content item. Alternatively or in addition, the automatic memory system can determine, for each particular content item, the closest such distance or a combination of a threshold number of such distances (e.g., a combination of the closest three distances between key terms and tags for that particular content item).

In some implementations for the third process, the automatic memory system can additionally or alternatively use a model trained to take a set of key elements and a set of content item tags and produce a match score. This model can be trained, e.g., based on previous sharing activity on a conversation or social media platform. For example, a training item for this model can be the text of a portion of a conversation paired with the content item that was shared near that point in the conversation (where the above first and second processes can be used to get the key elements for this NL input and tags for the content item). The key elements from the part of the conversation can be matched to the memory tags of the shared content items to get training data items.

In some implementations, either of the above described versions of the third process can be used and the output from that process can be the second match scores. In other implementations, both of the above described versions of the third process can be used, and a combination of their outputs (e.g., summation, average, weighted average based on historical accuracy) can be used to compute the second match scores. Additional details on computing a second match score by applying a tag matching process are discussed below in relation to FIG. 6.

Existing content item storage and organization systems allow users to search for and filter content items, e.g., by name, length, or even by category or other tags. Alternatively, existing systems allow a user to manually browse through their content items. However, these systems require that a user have a starting point of where to look and have enough information in a searchable category to come up with the content item they are looking for. Further, these systems are a hinderance when a content item is required for a conversation, as it can take a user significant time to load the program and perform a search. The automatic memory system and processes described herein overcome these problems associated with conventional content item selecting systems and are expected to provide users with greater ability to effectively communicate with automatic selection of content items matching user provided natural language. The automatic memory system can automatically select content items matching user-provided natural language, e.g., from an auditory or written conversation or from a voice or textual command in a manner that significantly increases efficiency of use with faster selection, less need to check multiple repositories, and more effective communication. Through automatic selection of content items matching natural language statements, using sophisticated selection models, content item constraints, and contextual signals, conversations (or other content item selection processes) that employ the automatic memory system can be more informative and effective, faster, and more engaging. The automatic memory system and processes described herein are rooted in computerized machine learning systems, instead of being an analog of human activities for browsing for content items or other selection techniques. For example, existing content selection systems require significant knowledge of where to look and what a user is looking for to make an effective search. The automatic memory system, to the contrary, allows a user to merely speak or type, and have relevant content items provided.

Several implementations are discussed below in more detail in reference to the figures. FIG. 1 is a block diagram illustrating an overview of devices on which some implementations of the disclosed technology can operate. The devices can comprise hardware components of a device 100 that computes match scores between content items and NL input and provides highest scoring content items. Device 100 can include one or more input devices 120 that provide input to the Processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, automatic memory system 164, and other application programs 166. Memory 150 can also include data memory 170, e.g., various machine learning models (e.g., that match NL segments to content items, that generate tags for content items, that identify key elements from NL input, that and that determine match scores between key elements and content item tags), training data for these models, NL inputs, content items, identified key elements, content items tags, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
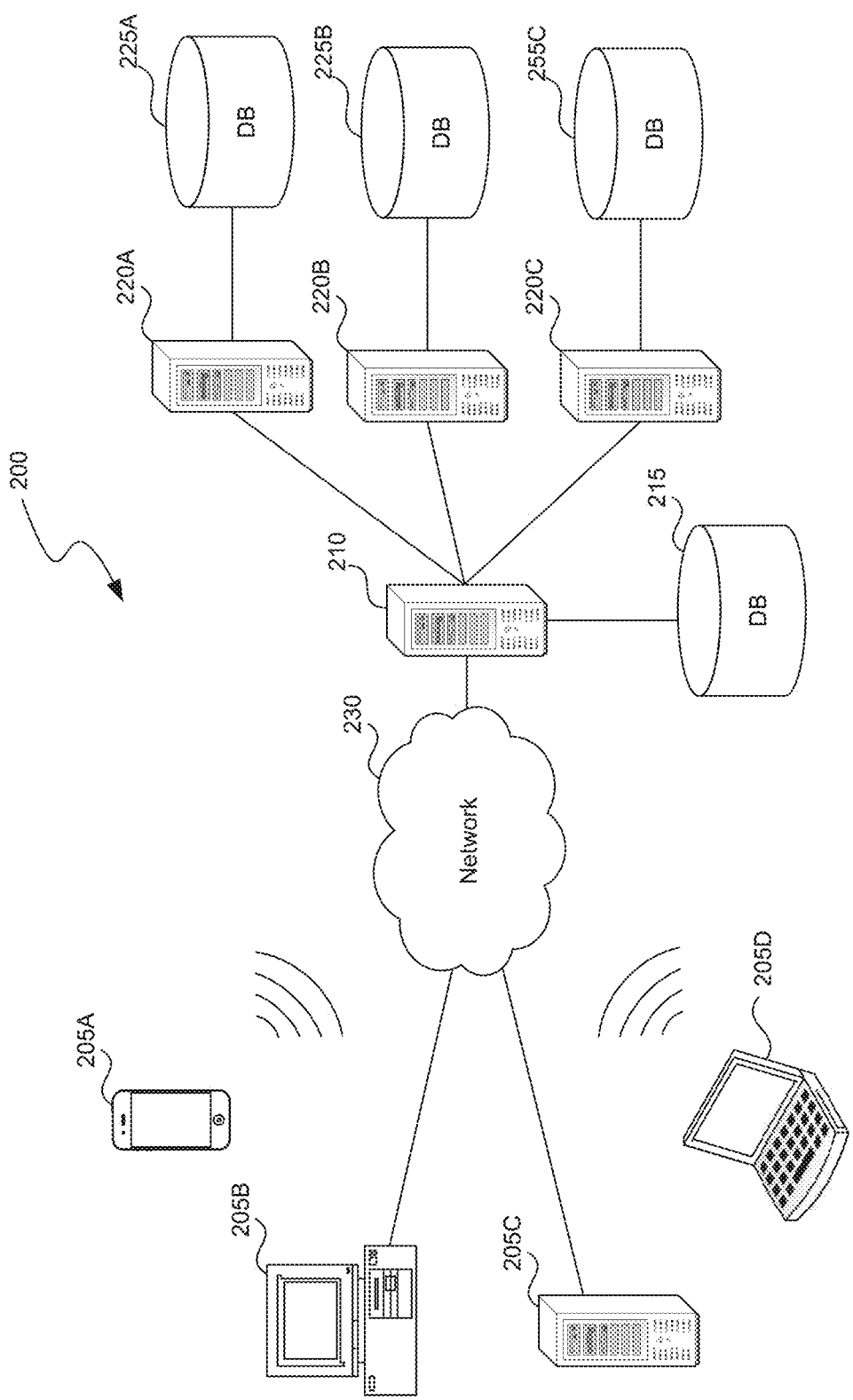
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

In some implementations, servers 210 and 220 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g. indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g. longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph, A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users; can enable a user to post a message to the user's wall or profile or another user's wall or profile; can enable a user to post a message to a group or a fan page; can enable a user to comment on an image, wall post or other content item created or uploaded by the user or another user, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, or an instant message external to but originating from the social networking system. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 3:
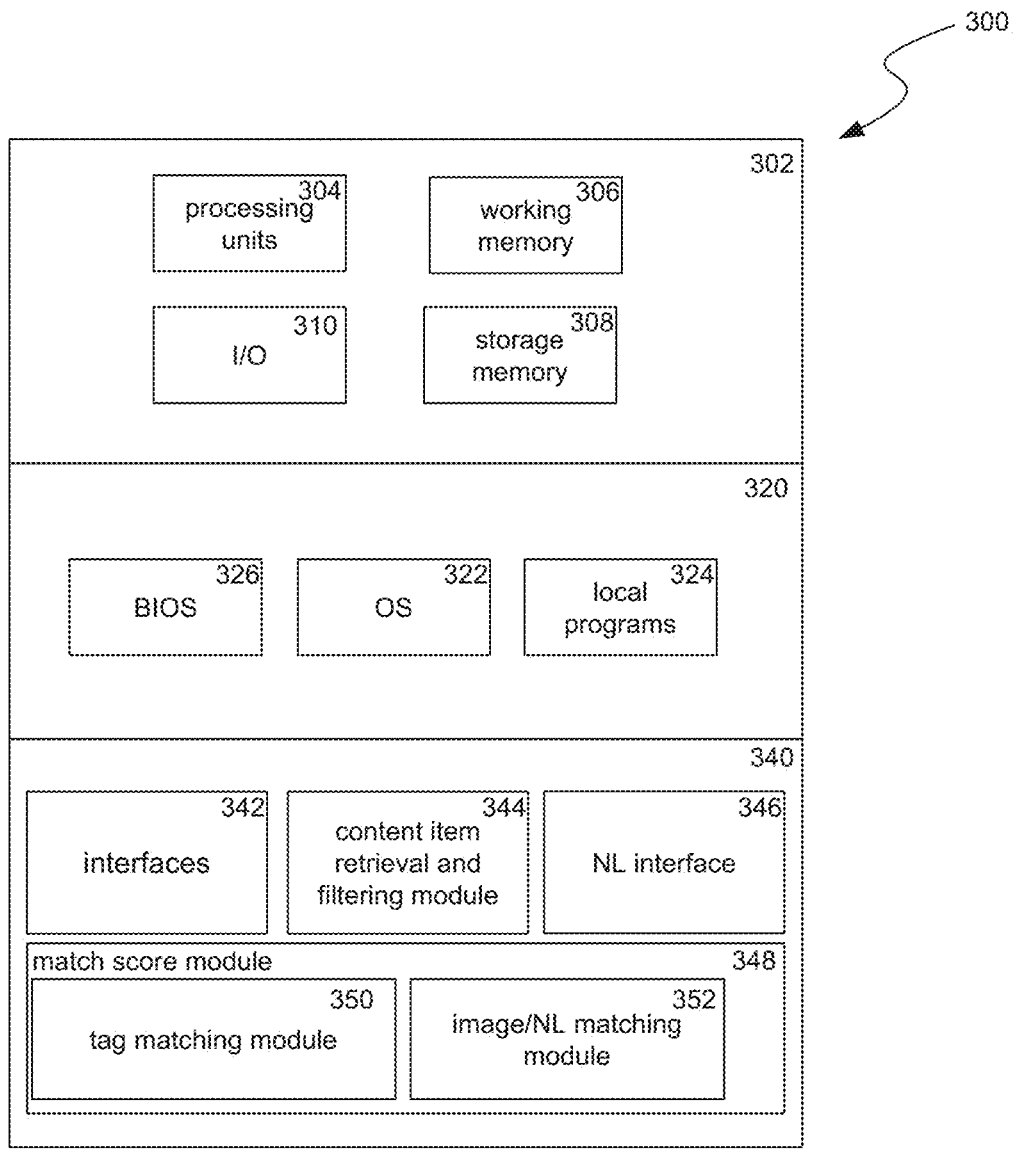
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include content item retrieval and filtering module 344, NL interface 346, match score module 348, tag matching module 350, image/NL matching module 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Content item retrieval and filtering module 344 can select one or more potential memory content items for a NL input. Content item retrieval and filtering module 344 can select the potential memory content items from sources such as social media providers, local content item repositories, cloud storage providers, public sources of content items, etc. In some implementations, content item retrieval and filtering module 344 pre-filters which content items are retrieved, e.g., by selecting those with a particular relationship to a provider of the NL input (e.g., as determined by social graph connections, geo-location connections, sharing activity, etc.) Selecting potential content items is described in greater detail below in relation to block 404 of FIG. 4.

NL interface 346 can obtain natural language (NL) input. In various implementations, NL interface 346 can accomplish this by recording audio input via a microphone or receiving textual input via a keyboard or via a network connection. In some implementations, NL interface 346 can convert audio NL input into text. Obtaining NL input is described in greater detail below in relation to block 402 of FIG. 4.

Match score module 348 can generate a match score between the NL input obtained by NL interface 346 and the content items selected by content item retrieval and filtering module 344. In various implementations, match score module 348 can generate the match score using output from tag matching module 350, using output from image/NL matching module 352, or using a combination of both (e.g., by averaging them).

Tag matching module 350 can identify key elements for the NL input from NL interface 346 such as people, objects, places, dates or times, activities, etc. specified in the NL input. Additional details on obtaining NL input key elements are provided below in relation to block 602 of FIG. 6. Tag matching module 350 can also identify one or more tags for the content items selected by content item retrieval and filtering module 344. Additional details on obtaining content item tags are provided below in relation to block 606 of FIG. 6. Finally, tag matching module 350 can generate a match score by comparing the key elements to the tags for each content item. Additional details on computing a match score using content item tags and key elements are provided below in relation to block 608 of FIG. 6.

Image/NL matching module 352 can segment the NL input from NL interface 346 into text sections. Image/NL matching module 352 can then apply a model, which takes as input both a text section and a content item, to each possible combination of A) a content item (from content item retrieval and filtering module 344) and B) one of the text sections. Though referred to herein as "image/NL" matching, in various implementations, the model can take, in addition to the NL segment, image content, audio content, video content, or a combination thereof. This model can produce sub-match scores and the image/NL matching module 352 can combine (e.g., average) the sub-match score corresponding to each content item into a match score for that content item. Additional details on computing a match score by providing content items and text sections to a model are provided below in relation to FIG. 5.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
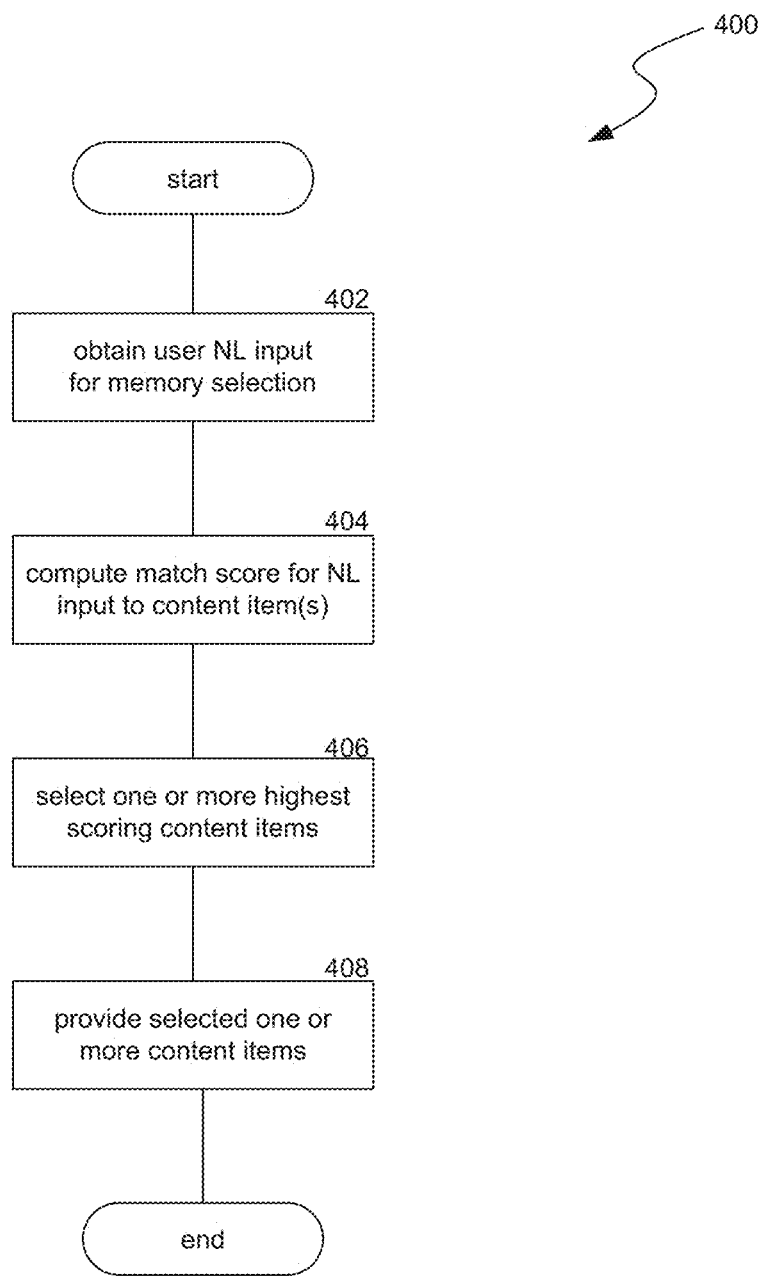
FIG. 4 is a flow diagram illustrating a process used in some implementations for automatically identifying memory content items for user natural language input.

FIG. 4 is a flow diagram illustrating a process 400 used in some implementations for automatically identifying memory content items for user natural language input. In some implementations, process 400 can be performed automatically as a user provides NL inputs, such as by part of an instant message, video chat, email, text, or other digital conversation system. In some implementations, process 400 can be performed in response to a user command, e.g., when a user activates a control to search for a content item, says a search command phrase, or when a user selects a particular section of NL input. In some cases, process 400 can be performed on a user's local device (e.g., by a phone or automated assistant device). In some cases, process 400 can receive audio or text of a conversation or a command to find a content item; such conversation NL input can be from an in-person conversation or a conversation using the local device such as an IM or text message conversation or video chat. In some implementations, process 400 can be performed by a server-side system that is facilitating a digital conversation or after having received such conversation or command data from a local system.

At block 402, process 400 can obtain user natural language (NL) input for selection of a memory content item. In some implementations, user-provided NL input can be obtained in response to a trigger, such as the user proceeding the NL input with a spoken command, pressing a button on a device, or activating a UI element. In various implementations, process 400 can obtain the NL input from, for example, a recording of a spoken conversation or command, a textual conversation (e.g., email, text message, IM, etc.), a textual command (e.g., entering the text in a search bar), or other sources of natural language. In some cases where the NL input is in the form of audio, existing transcription processes can be used to convert the audio to text. In various implementations of these cases, process 400 can use only the text, can also use the audio or, based on the audio, tag the text with inflection/emotion indicators determined for portions of the text.

At block 404, process 400 can compute a match score between the NL input and each of one or more potential memory content items (i.e., content items that will be checked by process 400 for matching the NL input from block 402). The potential memory content items can be retrieved from various sources such as content items posted to social media by one or more of: A) the NL input provider, B) one or more other participants in the thread, or C) a user with a particular level of connection, on a social media source, with the NL input provider or with the one or more other thread participants. As further examples, the content items can be obtained based on one or more categories or keywords pre-defined for the content items matching one or more categories or keywords determined for the NL input. Yet further, the content items can be from a user selected or default source, such as personal repositories (e.g., a local folder or album of the user, a designated cloud storage provider or area thereon, etc.) or public sources (e.g., public social media posts, news reports, cloud image or video services, streaming services, etc.) In some implementations, instead of obtaining the content items, process 400 can receive descriptive items for the content items, such as tags determined for the content items or other meta-data. In some cases, process 400 can receive versions of the content items suitable for machine learning input, such as histograms.

For each content item, process 400 can compute a match score indicating how closely the content item is expected to match the NL input. Process 400 can compute each match score using a variety of algorithms and/or machine learning models. In some implementations process 400 can use an image/NL matching process to compute each match score. The image/NL matching process can include segmenting the NL input into sections and, for each content item, for each text selection: applying a model trained to take NL text and a content item and produce a score on how well they match. The image/NL matching process can then combine the partial match scores corresponding to each content item. Additional details on computing match scores using an image/NL matching process are described below in relation to FIG. 5. In some implementations, process 400 can compute each match score using a tag matching process. The tag matching process can include identifying key elements of the NL input (e.g., objects, people, actions, dates, etc.), obtaining tags for each potential memory content item, and matching the tags to the key elements to get a match score. Additional details on computing match scores using a tag matching process are described below in relation to FIG. 6.

While process 400 can compute a match score for a particular content item using the image/NL matching process or the tag matching process alone, in yet further implementations, process 400 can compute, for each content item, both a first match score from the image/NL matching process and a second match score from the tag matching process and combine them into a final match score for the content item. Process 400 can, for a given image content item, use the image/NL matching process by applying a machine learning model trained to produce sub-scores of the first match score when it receives the content item and each of one or more NL sections. Process 400 can combine the sub-scores into the first match score for the content item. Process 400 can also use a tag matching process that determines a second match score by comparing key elements of the NL input with tags for the content item. The process 400 can then combine the first and second match scores, e.g., by adding or averaging them. In some implementations, the first and second match scores can be weighted, e.g., based on confidence values for each process, determined based on a historical accuracy determined for each process. For example, whether a user selects each content item suggested by process 400 to share in a conversation can be identified as positive (selection occurred) or negative (selection did not occur) and used as further training data for the various machine learning models and/or can be compared with which of the matching processes to compute accuracy scores for the models. Accuracy scores can be computed based on alternate scores also, such as social media "like" counts on selected content items, manual user feedback on whether suggested content items were accurate, or when users select a content item to share that was not one of the suggested content items.

At block 406, process 400 can select one or more content items that qualify and that have the highest match scores. In some implementations, all analyzed content items can qualify. In other implementations, content items must have a match score above a threshold (e.g., on a 0-1 scale, 0.5, 0.7, or 0.85) to qualify. In some cases, selected content items must have a match score that is a threshold amount above those of non-selected content items to qualify. In some implementations, process 400 can select a maximum amount of top-scoring content items, such as the top one, three, five, or ten.

At block 408, process 400 can provide the one or more content items selected at block 406. In some implementations, providing selected content items can include automatically adding the selected content items as part of the conversation from which the NL input was obtained (e.g., as a new item in the conversation thread or in a designated content item location). In other implementations, the selected content items can be automatically output, e.g., by playing a selected video or audio file or displaying a selected image. In yet further implementations, the selected content items can be provided to the user who entered the NL input, from which that user can make a further selection or approval of before the content item(s) are added to the conversation or otherwise displayed for other users.

As discussed above, these further selections by the user can be used to identify additional training data used to update training of the machine learning models. For example, if a user makes a selection of one of the suggested content items, that can be used as a further positive training item (the content item selected paired with the NL input) while a user's selection of an alternate content items not part of the suggested one or more content items can create one or both of a positive training item (the content item selected paired with the NL input) and a negative training item (the one or more non-selected content items paired with the NL input).

Figure 5:
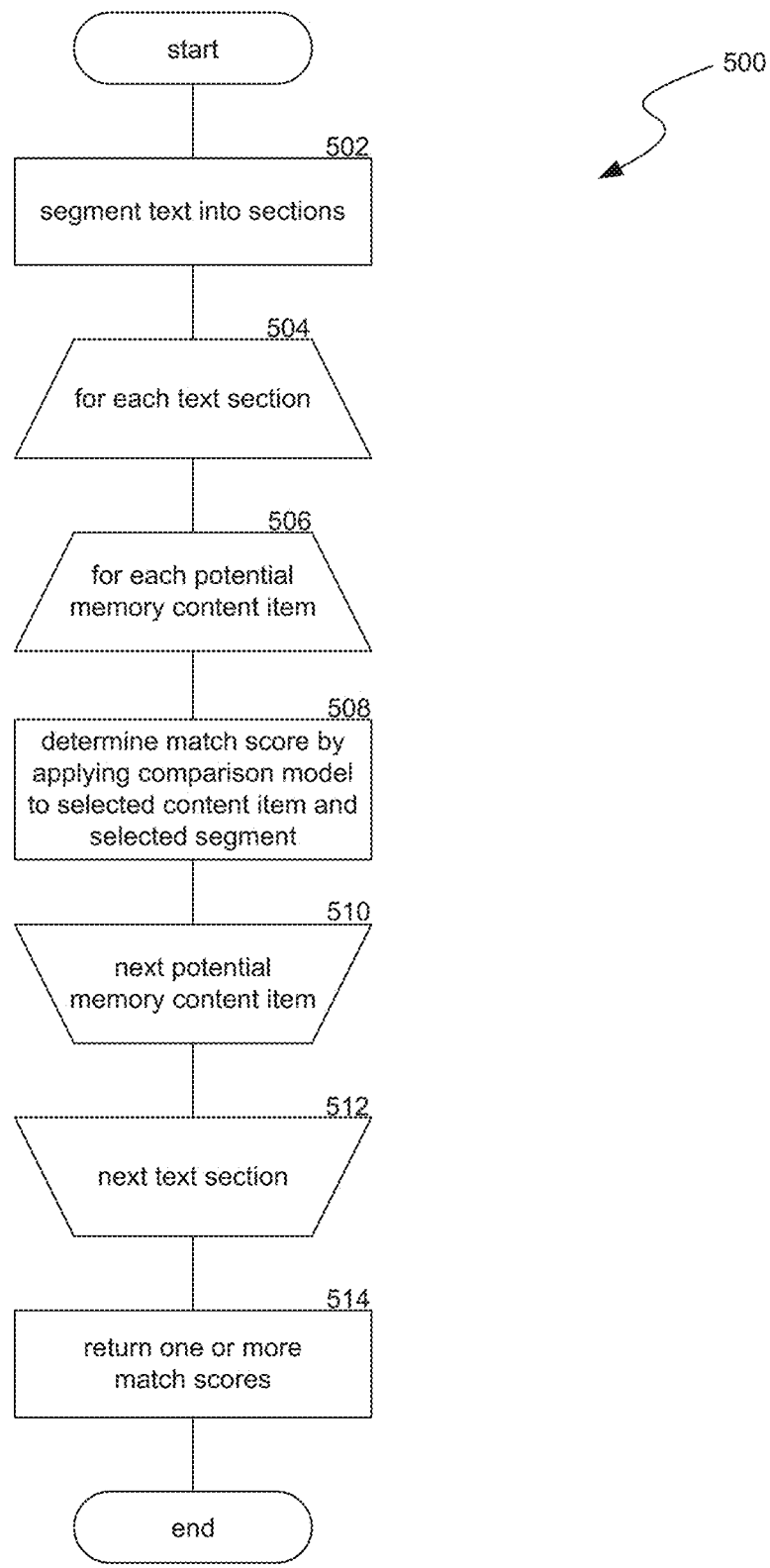
FIG. 5 is a flow diagram illustrating a process used in first implementations of determining match scores between memory content items and user natural language input.

FIG. 5 is a flow diagram illustrating a process 500 used in first implementations of determining match scores between memory content items and user natural language input. In some implementations, process 500 can be performed as a sub-process of process 400, e.g., executed from block 404.

At block 502, process 500 can segment received NL input (e.g., from block 402) into sections. In various implementations, process 500 can segment the NL input into sections such as sentences, noun phrases, or independent clauses. Process 500 can use existing NL processing models to achieve this, such as parts of speech taggers and NL semantic models.

At block 504, process 500 can begin a loop between blocks 504 and 512, where each iteration operates on a selected one of the text sections resulting from the segmenting at block 502, iterating through the entire set of text sections. At block 506, process 500 can begin a loop between blocks 506 and 510, where each iteration operates on a selected content item, iterating through an entire set of content items (e.g., the potential memory content items from block 404). Thus, these two loops operate for each selected text section and for each selected potential memory content item.

At block 508, process 500 can apply a model trained to determine a match score between a content item and a NL text section. As discussed below, an example of such a model can be a version of a neural network trained on pairs of A) a content item and a NL text section input with B) an indicator of whether they match. An example of such a model is the ViLBERT model (described in "ViLBERT: Pretraining Task-Agnostic Visiolinguistic Representations for Vision-and-Language Tasks" by Jiasen Lu, Dhruv Batra, Devi Parikh, and Stefan Lee; available at https://arxiv.org/abs/1908.02265, which is incorporated herein by reference), but other models can also be used. In some various implementations, the model can take, in addition to the NL segment, image content, audio content, video content, or a combination thereof. Thus, for the selected text section and selected content item, block 508 can apply the model to produce a match score.

At block 510, process 500 can select the next potential memory content item from the set and return to block 506 to continue the inner loop. Once the inner loop between blocks 506 and 510 has operated on each of the content items in the set, process 500 can continue to block 512. At block 512 process 500 can select the next text section from the set of sections determined at block 502 and return to block 504 to continue the outer loop. Once the outer loop between blocks 504 and 512 has operated on each of the text sections in the set, process 500 can continue to block 514.

At block 514, process 500 can return one or more of the highest match scores. In some implementations, process 500 can return all match scores while in other implementations, only a threshold number of the highest match scores are returned. In some implementations, before being returned, the match scores generated for each text section, for a particular content item are combined into a match score between the content item and the entire NL input. For example, these scores can be averaged.

Figure 6:
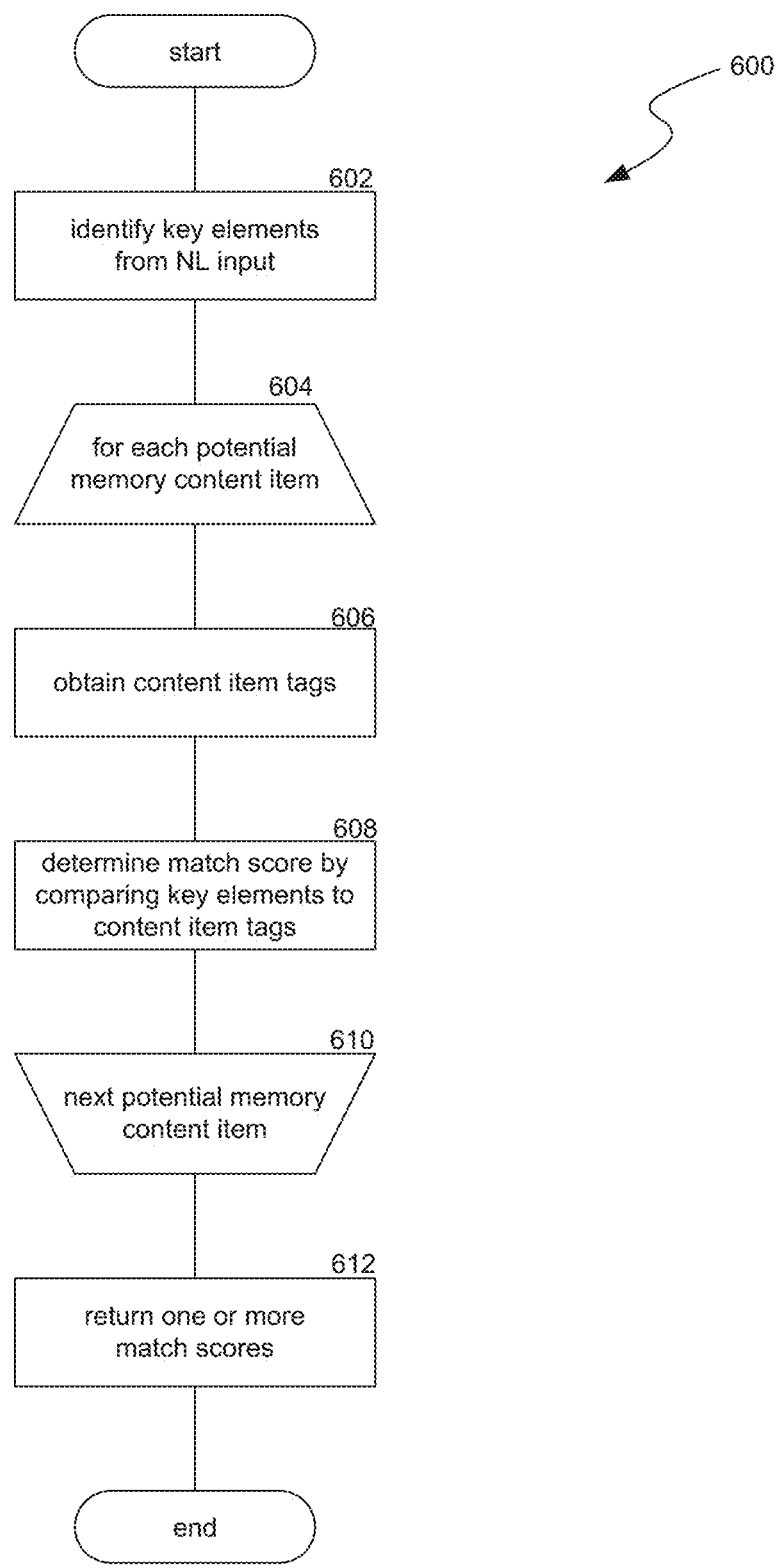
FIG. 6 is a flow diagram illustrating a process used in second implementations of determining match scores between memory content items and user natural language input.

FIG. 6 is a flow diagram illustrating a process 600 used in second implementations of determining match scores between memory content items and user natural language input. In some implementations, process 600 can be performed as a sub-process of process 400, e.g., executed from block 404.

At block 602, process 600 can identify key elements for the NL input (e.g., the NL input obtained at block 402). Key elements can be portions of the NL input identified in particular categories such as people, places, objects, activities, or times/dates. Process 600 can apply a machine learning system to identify such key elements, e.g., by applying existing parts-of-speech taggers, natural language semantic models, etc. Further or alternate heuristics can be applied to identify which words or phrases in the NL input are key phrases. For example, words or phrases can be boosted in the machine learning model to be more likely selected as key phrases when they correspond to other data for the user. For example, phrases in the NL input can be boosted when they correspond to people, places, activities, etc., that the user is linked to A) on the social graph (e.g., who the user is friends with, what activities the user engages in, where the user has checked in, etc.), B) through identified geo-location similarities (e.g., locations the user is known to have visited), C) via sharing activity (e.g., who the user has interacted with, what type of content the user is most likely to share), or etc. This allows process 600 to identify as key elements or as priors for the machine learning models people, places, things, or acts described in the NL input that have a special association with the source user.

At block 604, process 600 can begin a loop between blocks 604 and 610, where each iteration operates on a selected content item, iterating through an entire set of content items (e.g., the potential memory content items from block 404). Thus, this loop operates for each selected potential memory content item.

At block 606, process 600 can obtain tags for the current selected content item from block 604. In some implementations, process 600 can use a machine learning system to identify tags for a content item such as objects, people, places, actions, audio (which may be converted to text), dates/times, etc. depicted in the content item. For example, the machine learning model can be trained using human tagged content items, social media hash tags on content items, messages or posts provided in conjunction with content items, etc. Some of these tags can be determined using existing models e.g., existing object, place, transcription, or person recognition models. Some tags can be based on audio or video of the content item, such as by identifying and tagging certain sounds (e.g., laughing, falling rain, waves, barking, etc.) or converting spoken language to text. User provided tags on content items (such as the title, a hashtag when the content item was posted, comments by the content item poster or from others on a social media platform, etc.) or meta-data on content items (such as date captured, size, location, etc.) can also or alternatively be used as content item tags. In some implementations, these tags can be pre-determined for content items using the above machine learning model, user-provided tags, etc., and process 600 can retrieve them (in addition to or instead of the content items).

At block 608, process 600 can determine a match score between the key elements identified at block 602 and the tags obtained at block 606. In some implementations, process 600 can accomplish this using embedding matching where process 600 employs a model trained to map the key elements and the tags into the same n-dimensional semantic space. Process 600 can then compute a match score based on the distances (e.g., cosine distance) between one or more of the key element embeddings and the tag embeddings. For example, process 600 can average this distance between a threshold number (including just one or all) of the closest or most distant embeddings between the key elements and the tags. As another example, process 600 can take the distance between the center of the key element embeddings and the center of the tag embeddings.

In some implementations, process 600 can additionally or alternatively determine a match score between the key elements and the tags by applying a model to them trained to take a set of key elements and a set of content item tags and produce a match score. This model can be trained, e.g., based on previous sharing activity on a conversation or social media platform. For example, the input for a positive training item can be A) key elements determined for the text of a portion of a conversation paired with B) tags for the content item that was shared near that point in the conversation.

At block 610, process 600 can select the next potential memory content item from the set and return to block 604 to continue the loop. Once the loop between blocks 604 and 610 has operated on each of the content items in the set, process 600 can continue to block 612.

At block 612, process 600 can return one or more of the highest match scores. In some implementations, process 600 can return all match scores while in other implementations, only a threshold number of the highest match scores are returned.

Figure 7:
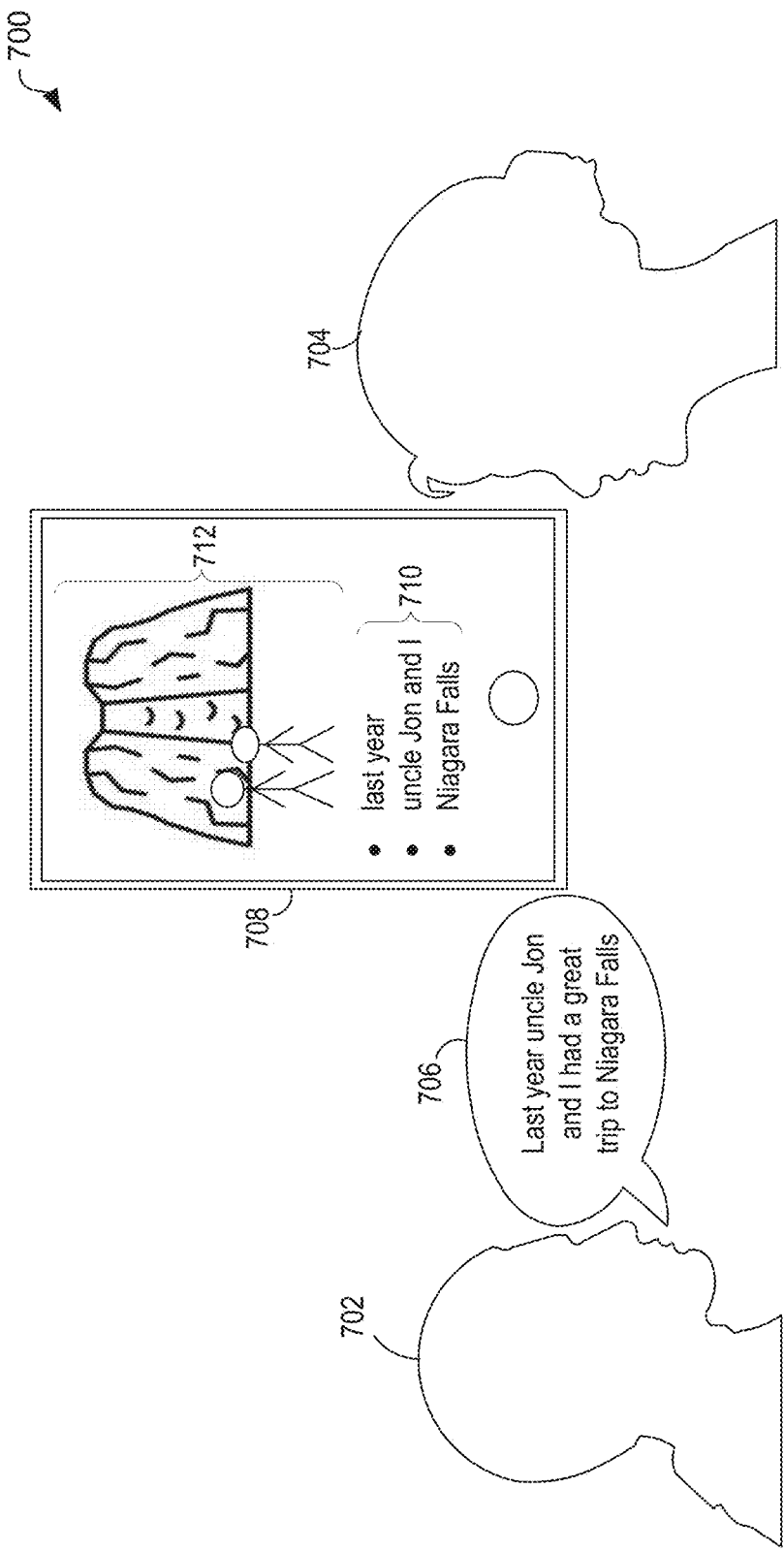
FIG. 7 is a conceptual diagram illustrating an example of automatic memory content item presentation based on a live conversation.

FIG. 7 is a conceptual diagram illustrating an example 700 of automatic memory content item presentation based on a live conversation. Example 700 include two participants 702 and 704 having an auditory conversation. Device 708 is performing process 400 and has been configured to receive NL input through a microphone, convert it to text, and find matching content items stored on the device or that one of the users has posted to social media. In example 700, participant 702 has spoken the phrase "Last year Uncle Jon and I had a great trip to Niagara Falls." Device 708 has obtained this as NL input and has identified key elements (displayed as 710; note in some implementations the key elements are not displayed). Device 708 has computed a first set of match scores by applying a model to match the key elements 710 with tags identified for the content items stored on device 708 and to tags for content item that participant 702 has posted to a social media site. Device 708 has also segmented the NL input 706 into sections, compared the sections to the same content items using the ViLBERT model and produced a second set of match scores for the content items. Finally, device 708 has combined the match score from each set corresponding to the same content item to get a final match score for that content item. The resulting best match was for an image 712 depicting the place Niagara Falls, tagged with the participant 702 and a user with the name Jon and identified in a social graph as participant 702's uncle, and tagged with a capture date of eleven months ago. This content item was automatically displayed on device 708 for viewing by conversation participants 702 and 704.

FIGS. 8A and 8B are conceptual diagrams illustrating examples 800 and 850 of automatic memory content item presentation based on a textual conversation. Example 800 includes a device 808 which is executing an application to have a textual conversation with device 858 of example 850. Device 808 is displaying a text input area 802, a thread 804, and a content item display area 806. In example 800, an intermediary device for the conversation has already matched the NL input "My dog and I went on a hike this morning" to a content item, which it provided for display in area 806. The user is also currently entering the further NL input "until we came upon a dense forest." When this further NL input is sent, process 400 is performed by the intermediary device to select a further content item, areas 806 and 856 on each of devices 808 and 858 are updated to show the selected content item with the best match score for "until we came upon a dense forest."

A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the models described above can be a neural network with multiple input nodes that receive, e.g., representations of content item, tags, key elements, natural language, etc. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input, for example, by providing a match score between the inputs or by providing new tags or key element identifications. In some implementations, some neural networks, known as deep neural networks, can have multiple layers of intermediate nodes with different configurations, can be a combination of models that receive different parts of the input and/or input from other parts of the deep neural network, or are convolutions (partially using output from previous iterations of applying the model as further input to produce results for the current input and/or operating different parts of the model on different parts of the input or at different resolutions).

A machine learning model can be trained with supervised learning, where the training data includes sample input paired with a desired output. For example, a representation of a content item and NL input can be provided to the model paired with a designation of whether the content item matches the NL input. Output from the model can be compared to the desired output for that training item and, based on the comparison, the model can be modified, such as by changing weights between nodes of the neural network or parameters of the functions used at each node in the neural network (e.g., applying a loss function). After applying each of the training items and modifying the model in this manner, the model can be trained to evaluate new content item/NL input pairings to determine if they match. Similar process can be used for to train additional models, such as with content items paired with tags to train a model to select tags for a content item; NL input paired with key elements to train a model to select the key elements of the NL input; or key element/tag input paired with whether they match to train a model to compute a match score between key elements of NL input and tag from a content item.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for automatic presentation of memory content items, the method comprising:
    obtaining natural language (NL) input;
    computing match scores, wherein each match score indicates a match level directly between the NL input and one of multiple memory content items, and wherein each match score is based on a comparison directly between the NL input and one of the multiple memory content items, the comparison comprising:
        segmenting the NL input into sections;
        providing a particular memory content item and the sections to a machine learning model;
        generating multiple sub-match scores, each computed by applying the machine learning model to the particular memory content item and to one of the sections; and
        combining the sub-match scores, for the particular memory content item and the sections, into one of the match scores;
    selecting one or more memory content items corresponding to one or more of the highest computed match scores; and
    providing the selected one or more memory content items.

2. The method of claim 1, wherein the NL input is obtained from a textual conversation or a textual command entered by a user.

3. The method of claim 1,
    wherein the NL input is obtained in response to a trigger including one or more of: identifying a particular spoken command, a particular button being pressed, or activating a particular UI element;
    wherein the NL input is obtained from a recording of a spoken conversation or command;
    wherein the method further comprises transcribing the recording of the spoken conversation or command into text; and
    wherein the segmenting the NL input into sections comprises selecting sections from the transcribed text.

4. The method of claim 1, wherein the NL input is obtained from a user and wherein the method further comprises:
    obtaining the multiple memory content items from one or more of: A) posts, associated with an account of the user, on a social media platform, B) a repository on a device of the user; C) an account, associated with the user, on a cloud storage provider, or D) any combination thereof.

5. The method of claim 1 further comprising:
    obtaining at least two of the multiple memory content items from posts, associated with an account, on a social media platform;
    wherein the account is A) associated with a user who provided the NL input, B) associated with one or more other participants in a thread in which the NL input was provided, or C) associated, by at least a minimum specified level of connection on the social media platform, with the user who provided the NL input or with the one or more other participants in the thread.

6. The method of claim 1 further comprising obtaining the multiple memory content items by obtaining a plurality of content items and filtering the plurality of content items to be the multiple memory content items by excluding one or more content items from the plurality of content items that:

do not have a specified association, on a social graph, with a user that provided the NL input;

do not have a specified geo-location designation; or are not associated with a specified social media sharing activity from or to the user that provided the NL input.

7. The method of claim 1, wherein the segmenting the NL input into sections is performed by identifying sentences, noun phrases, and/or independent clauses in the NL input.

8. The method of claim 1, wherein the machine learning model is a neural network model trained, to determine a match score between a content item and a NL text section, using training items comprising pairs of A) a content item and a NL text section input and B) an indicator of whether the content item and NL text section match.

9. The method of claim 1, wherein combining the sub-match scores comprises adding or averaging the sub-match scores.

10. The method of claim 1, wherein the providing the selected one or more memory content items comprises one or more of:

automatically adding the selected one or more content items as part of a conversation from which the NL input was obtained; or receiving authorization to display the selected one or more content items by:

providing an indication of the selected one or more content items to a user who provided the NL input;

receiving approval from the user who provided the NL input; and in response to the approval, causing the selected one or more content items to be displayed to one or more users, wherein at least one of the one or more users is a user other than the user who provided the NL input.

11. A computer-readable storage medium storing instructions that, when executed by a computing system, cause the computing system to perform a process for automatic presentation of memory content items, the process comprising:

obtaining natural language (NL) input;

identifying one or more key elements for the NL input;

computing match scores, wherein each match score indicates a match level directly between the NL input and one of multiple memory content items, and wherein each match score is based on a comparison directly between the NL input and one of the multiple memory content items, the comparison comprising:

obtaining one or more content item tags for the particular memory content item; and computing the match score for the particular memory content item and the NL input by determining a level of matching directly between the one or more key elements and the one or more content item tags for the particular memory content item;

selecting one or more memory content items corresponding to one or more of the highest computed match scores; and providing the selected one or more memory content items.

12. The computer-readable storage medium of claim 11, wherein the NL input is obtained from a user and wherein the process further comprises:

obtaining the multiple memory content items from one or more of: A) posts, associated with an account of the user, on a social media platform, B) a repository on a device of the user; C) an account, associated with the user, on a cloud storage provider, or D) any combination thereof.

13. The computer-readable storage medium of claim 11, wherein the process further comprises:

obtaining at least two of the multiple memory content items from posts, associated with an account, on a social media platform;

wherein the account is A) associated with a user who provided the NL input, B) associated with one or more other participants in a thread in which the NL input was provided, or C) associated, by at least a minimum specified level of connection on the social media platform, with the user who provided the NL input or with the one or more other participants in the thread.

14. The computer-readable storage medium of claim 11, wherein the identifying the one or more key elements for the NL input comprises applying a machine learning key elements model to the NL input, wherein the machine learning key elements model was trained to identify key elements using training item pairs each comprising A) NL text paired with B) key elements mapped to the NL text.

15. The computer-readable storage medium of claim 11, wherein the obtaining the one or more content item tags for the particular memory content item comprises applying a machine learning tagging model to particular content item, wherein the machine learning tagging model was trained to determine content item tags using training items comprising pairs each comprising A) a content item paired with B) one or more tags mapped to the content item.

16. The computer-readable storage medium of claim 11, wherein the determining the level of matching is performed by:

embedding the one or more key elements into an n-dimensional space;

embedding the one or more content item tags into the n-dimensional space; and computing one or more distances, in the n-dimensional space, between the embedded one or more key elements and the embedded the one or more content item tags.

17. The computer-readable storage medium of claim 11, wherein the providing the selected one or more memory content items comprises:

providing an indication of the selected one or more content items to a user who provided the NL input;

receiving approval from the user who provided the NL input; and in response to the approval, causing the selected one or more content items to be displayed to one or more users, wherein at least one of the one or more users is a user other than the user who provided the NL input.

18. A computing system for automatic presentation of memory content items, the computing system comprising:

one or more processors; and one or more memories storing instructions that, when executed by the one or more processors, cause the computing system to perform a process comprising:

obtaining natural language (NL) input;

computing match scores, wherein each match score indicates a match level directly between the NL input and one of multiple memory content items, and wherein each match score is computed by:

applying an image/NL matching module that:

obtains one or more content item tags for the particular memory content item; and computes the match score for the particular memory content item and the NL input by determining a level of matching directly between one or more key elements identified for the NL input and the one or more content item tags for the particular memory content item; or applying a tag matching module that:
  segments the NL input into sections;
  receives, as input, the particular memory content item and the sections;
  generates multiple sub-match scores, each computed by applying a machine learning model to the particular memory content item and to one of the sections; and
  combines the sub-match scores, for the particular memory content item and the sections, into one of the match scores;

selecting one or more memory content items corresponding to one or more of the highest computed match scores; and providing the selected one or more memory content items.

19. The computing system of claim 18, wherein the computing the match scores is performed by the applying the image/NL matching module.

20. The computing system of claim 18, wherein the computing the match scores is performed by the applying the tag matching module.

* * * * *